No. 841,256. PATENTED JAN. 15, 1907.
J. H. KELLY.
RUNNING GEAR FOR CARS.
APPLICATION FILED FEB. 23, 1906.
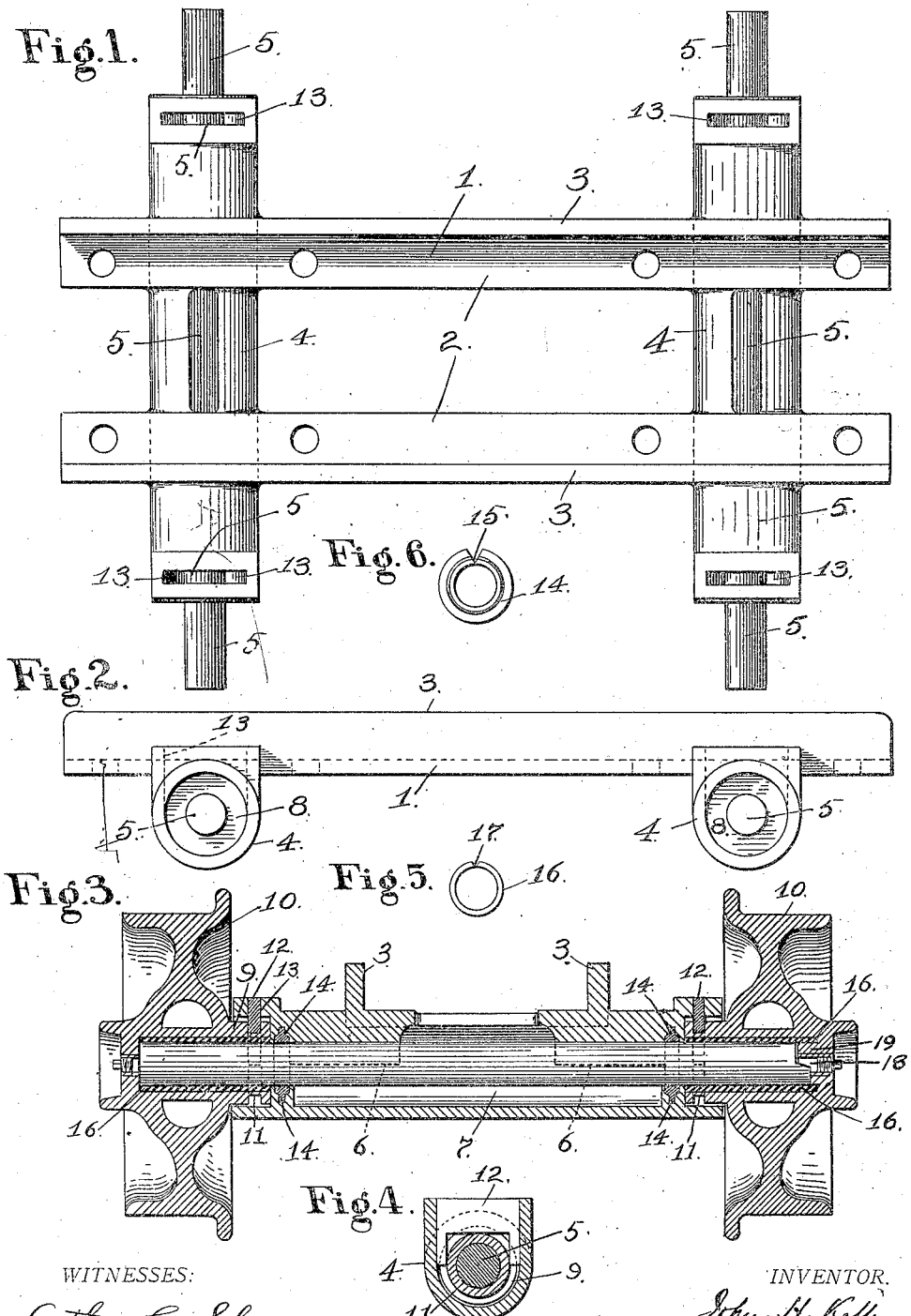
WITNESSES:
INVENTOR.
John H. Kelly
BY
ATTORNEY.

UNITED STATES PATENT OFFICE.

JOHN H. KELLY, OF SAN FRANCISCO, CALIFORNIA.

RUNNING-GEAR FOR CARS.

No. 841,256.  Specification of Letters Patent.  Patented Jan. 15, 1907.

Application filed February 23, 1906. Serial No. 302,588.

*To all whom it may concern:*

Be it known that I, JOHN H. KELLY, a citizen of the United States, residing at San Francisco, in the county of San Francisco and State of California, have invented certain new and useful Improvements in Running-Gear for Cars, of which the following is a specification.

This invention relates to a truck-frame and bearing for the shafts thereof, the object of the invention being to provide a frame and bearings which can be produced very cheaply by avoiding the cost of machine-work and which will be durable in use.

In the accompanying drawings, Figure 1 is a plan view of a truck-frame and bearings. Fig. 2 is a side view. Fig. 3 is an enlarged longitudinal section of the axle-bearing. Fig. 4 is a cross-section on the line 4 4 of Fig.
3. Fig. 5 is an end view of the bushing for the wheel. Fig. 6 is a side view of the bushing for the axle-bearing.

Referring to the drawings, 1 represents a truck-body cast in a single piece having side members 2 with flanges 3 to hold the wooden body of the truck-frame and having also the two hollow cylindrical cross members 4 to receive the axles 5. Each cross member is formed at the ends with the semicircular bearings 6 to rest upon the axle and spaced from the axle the entire circumference thereof between said bearings to form an oil-chamber 7. The ends of the cross members are formed with sockets 8 to receive the hubs 9 of the car-wheels 10, said hubs being formed with annular grooves 11, into which are dropped U-shaped locking devices 12, passed down in slots 13 in the terminal portions of the cross members, said locking devices thereby retaining the wheels in place. Between the semicylindrical portions and the sockets are provided bushings 14, of soft metal, in annular recesses of corresponding shape in the ends of the cross members.

In casting this combined truck-frame and bearings the axles are first inserted in their places in the sand cores for the hollow cross members, and the truck-frame is then cast directly upon the axles. This causes the part of the bearing which is cast upon the axle to be chilled, thereby hardening its surface and also providing a smooth surface requiring no machining. It is, however, of great importance that the sand core should
be so formed that the metal poured in only covers one-half of the axle, for if more than one-half of the bearing were cast around the axle it would be impossible to withdraw the latter. It results from this that an exact semicircular bearing is provided having a chilled surface. This is an important feature of the invention.

The truck-frame and bearings are also cast upon the chilled-iron bushings 14, and for this purpose the bushings are first cast upon a mandrel of slightly-larger diameter than the shaft—say one thirty-second of an inch. They are also formed with a V-shaped split 15. They are then placed upon the shaft, and the frame and bearings are cast upon them. In this way the bushing can expand when heated by the pouring of the molten metal and without cracking. When it again cools, it resumes its original diameter and can readily be withdrawn. By this invention, therefore, the truck-frame and the bearings for all four wheels thereof are formed very cheaply and simply.

The same method is applied for forming on each shaft the bushing 16 for the wheel, one of the wheels being fixed upon the shaft and the other revolving thereon to enable the wheels to roll on curved portions of the track without sliding friction. To so secure one wheel upon the shaft, the corresponding end of the shaft—that on the right in Fig. 3—is formed with a semicircular recess 18, and the hub of the wheel is formed with a corresponding lug 19, fitting in said recess and preventing the wheel turning on the shaft. This bushing is also first formed with a V-shaped split 17 on the mandrel of slightly-larger diameter.

I claim—

1. A truck-frame and axle-bearings therefor cast in one piece, substantially as described.

2. A truck-frame comprising side members and cross or end members, the latter being hollow, and having formed therein axle-bearings, all cast in one piece, substantially as described.

3. A truck-frame comprising side members and cross or end members, the latter being hollow, and having formed therein axle-bearings in cross-section not more than a semicircle, all cast in one piece, substantially as described.

4. A truck-frame comprising side members and cross or end members, the latter being hollow, and having formed therein chilled axle-bearings, all cast in one piece, substantially as described.

5. A truck-frame comprising side members and cross or end members, the latter being hollow, and having formed therein axle-bearings in cross-section not more than a semicircle, substantially as described.

6. A truck-frame comprising side members and cross or end members, the latter being hollow, and having formed therein chilled axle-bearings, substantially as described.

7. A truck-frame and axle-bearings therefor cast in one piece, and chilled-iron bushings around which it is cast, substantially as described.

8. A truck-frame and axle-bearings therefor cast in one piece, and chilled-iron bushings having V-shaped slits around which it is cast, substantially as described.

In witness whereof I have hereunto set my hand in the presence of two subscribing witnesses.

J. H. KELLY.

Witnesses:
BESSIE GORFINKEL,
ANNIE PETERSON.